United States Patent Office 3,255,590
Patented June 14, 1966

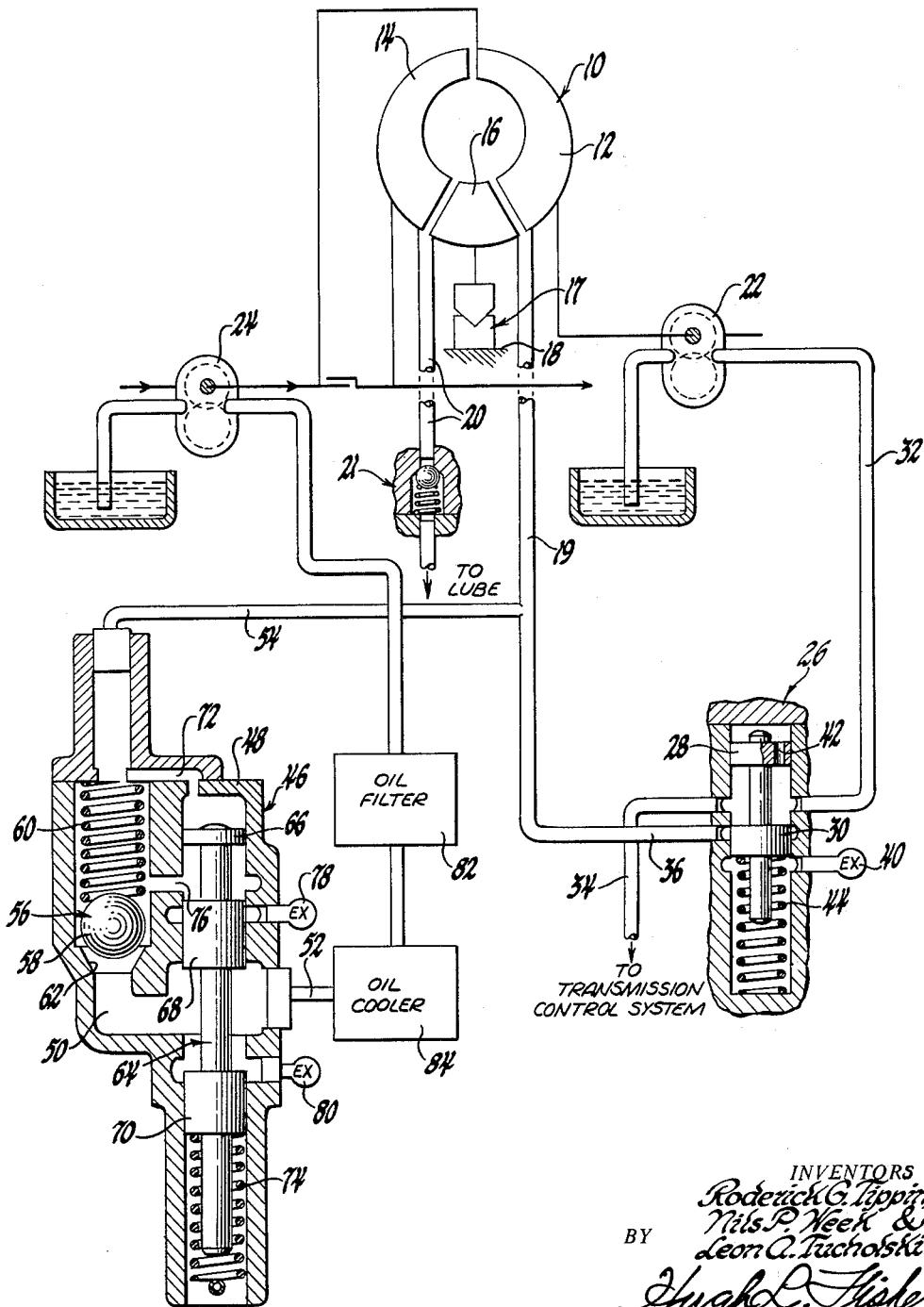

3,255,590
CONTROL SYSTEM WITH MULTIPLE PRESSURE SOURCE FOR PRESSURE OPERATED DEVICES
Roderick G. Tipping, Livonia, Nils P. Week, Allen Park, and Leon A. Tucholski, Wayne, Mich., assignors to General Motors Corporation, Detroit, Mich., a corporation of Delaware
Continuation of application Ser. No. 755,179, Aug. 15, 1958. This application Apr. 16, 1964, Ser. No. 360,385
8 Claims. (Cl. 60—54)

This invention relates to control systems, and particularly to control systems for pressure operated devices of the type employed, although not exclusively, in power transmitting apparatus. This application is a continuation of application Serial No. 755,179, filed August 15, 1958, now abandoned.

Frequently, in certain installations, a fluid pressure source is found to be wholly inadequate due to the excessive pressure variations resulting from different operating conditions. One instance occurs with pressure operated devices, such as those in power transmissions; for power transmissions often employ hydrodynamic torque transmitting devices, e.g., fluid couplings and torque converters, in combination with appropriate drive ratio changing mechanism, servo controlled planetary gearing being exemplary. A fluid pressure source initially supplies the main transmission control system which operates the servos so that multiple forward and reverse drive ranges may be obtained and then any surplusage is transferred to the control system for the hydrodynamic torque transmitting device. Therefore, the so-called charging pressure within the device can, when relying on this surplusage, vary considerably. This is undesirable since the charging pressures in a hydrodynamic torque transmitting device, particularly a torque converter, should be maintained within a predetermined pressure range for maximum effectiveness. If the charging pressure is allowed to deviate from this predetermined pressure range, excessive churn losses, cavitation, etc., can result.

With the foregoing in mind, the invention contemplates, broadly, the provision of a novel arrangement of multiple pressure sources so correlated as to utilize fully each source advantageously to produce and maintain pressures within a predetermined range. Specifically, the output from a main pressure source is supplemented by that from an auxiliary source so as to maintain the pressures within the predetermined ranges while employing each source output effectively.

The invention further seeks to maintain, by a unique control system, pressure within a pressure operated device between predetermined limits, under all operating conditions.

Another objective of the invention is to provide a hydrodynamic torque transmitting device with a control system which combines the output pressure from an auxiliary pump with that from a main pump by means of a control mechanism so that the pressure in the device is maintained within a predetermined range. A related object is to employ the auxiliary pump also for circulating fluid through a cooler.

In carrying out the invention according to one embodiment thereof, a hydrodynamic torque transmitting device is supplied fluid pressure by main and auxiliary pumps with the main pump contribution being determined by a distributor valve, and that from the auxiliary pump by a control mechanism which senses the pressure within the device. Hence, the auxiliary pump aids the main pump so that the fluid pressure in the device is always within a predetermined pressure range. If the main pump output is adequate, then the auxiliary pump output is diverted through a filter and a cooler and back to sump.

The foregoing and other objects and advantages of the invention will be apparent from the following description and from the accompanying drawing, in which a control system for a pressure operated device is illustrated schematically to demonstrate the principles of the invention.

Referring to the drawing, the numeral 10, denotes generally, a pressure operated device which may be some kind of a hydrodynamic torque transmitting device, such as the torque converter depicted. The torque converter 10 comprises an impeller 12 driven, e.g., by an engine (not shown), an output turbine 14, and a stator 16. Turbine 14 may be drive connected to ratio changing mechanism (not shown), for instance, servo controlled planetary gearing of a character that affords various forward and reverse drive ranges of operation. Stator 16 is prevented from backward rotation by a one-way mechanism 17, an element of which is grounded at 18. The one-way mechanism 17 may be of known construction employing sprags, rollers, or the like, to prevent relative rotation between the races in one direction only. Fluid pressure enters the torque converter 10 through an inlet 19 and causes the converter 10 to operate in a well known way with the fluid traversing a toroidal path in a counterclockwise direction successively from the impeller 12 through the turbine 14 and stator 16 and back to the impeller 12, thereby defining the converter working circuit. Flow of fluid from the converter 10 through an outlet 20 therefor is permitted by a suitable flow restriction in the outlet 20, for instance, an orifice or, as viewed, a check valve 21. The fluid passed by the check valve 21 may then be directed to lubricating channels and then to sump or directly to sump. The check valve 21 is preferably set to open only when the fluid pressure within the converter 10, or as it is commonly called, the converter charging pressure, is adequate, and thereafter, because the flow is still restricted, the resultant back pressure enables the charging pressure to be maintained without unduly burdening the pressure sources.

Charging pressure for the torque converter working circuit is furnished, in a manner to be explained, by a main pump 22 situated to the rear of the torque converter 10 and an auxiliary pump 24 positioned forwardly of the torque converter 10. Both of these pumps 22 and 24 are driven at the speed of the torque converter impeller 12 and are of the positive displacement type with the suction side of each connected to an appropriate fluid sump. Although the main pump 22 is illustrated as being driven at the speed of the torque converter impeller 12, it may be driven at the speed of some other component of the transmission, or if desired, driven by the torque converter turbine 14.

The primary function of the main pump 22, in the embodiment being described, is to supply fluid pressure to a transmission control system which establishes the various forward and reverse drive ranges. After the fluid pressure requirements of the transmission control system are satisfied, the remaining fluid pressure is then supplied to the control system for the torque converter 10 and to the transmission lubrication system. This routing of fluid pressure is accomplished by a fluid distributor, such as the distributor valve, depicted generally at 26. The distributor valve 26 is slidable in a bore in a valve body and has spaced lands 28 and 38. The valve body bore is provided with a series of spaced annular ports, one of which interconnects a main pump outlet line 32 extending from main pump 22 and a transmission control system supply line 34. Another of the ports is joined to a torque converter supply line 36 which, in turn, communicates with the converter inlet 19, while the remaining port functions as an exhaust and is denoted at 40. When the pump 22 is supplying fluid pressure to the main pump outlet line 32, fluid pressure is transferred from between the valve lands 28 and 30 through an axial bleed hole 42 in land 28 to the face of the land 28 and urges the distributor valve 26 downwardly against the opposing bias from a spring 44. The distributor valve 26 then, when this incoming fluid pressure is sufficient, will commence to regulate the pressure supplied to the transmission control system supply line 34 in a usual way, with the torque converter supply line 36 being opened during this regulation by valve land 30 so as to form a relief. Therefore, in this manner, a pressure will be developed which is determined by the spring force from spring 44, and only when the pressure supplied to the transmission control system reaches this regulated value, e.g., 95 p.s.i., will any fluid pressure be supplied to the torque converter 10. If the incoming pressure exceeds a certain value, the valve 26 will shift further downwardly and commence to regulate at a somewhat higher value, e.g. 110 p.s.i., with the exhaust port 40 acting as a relief. The diameters of the valve lands 28 and 30, and the force from the spring 44 may, of course, be varied as well as the spacing of the series of ports, to obtain different regulated pressures, if desired.

As can now be seen, it is possible that the main pump may not be revolved fast enough to meet both the demand from the transmission control system and the necessity for maintaining an adequate charging pressure within the converter 10 as well as afford sufficient fluid flow through the converter 10 both for cooling purposes and for the lubrication system at all impeller speeds. On the other hand, the pressure supplied to the torque converter 10 may be considerably greater than wanted. Consequently, a control mechanism, viewed generally at 46, is utilized along with the auxiliary pump 24 to insure that the converter charging pressure is always maintained within a predetermined range, e.g., between 40 and 60 p.s.i. Moreover, the capacity of the auxiliary pump 24 is selected to insure that the quantity of fluid flow through the converter 10 is adequate for cooling and lubrication under the most adverse conditions, e.g., at stall when the converter turbine 14 is held stationary by the load and the impeller 12 is receiving maximum torque.

The control mechanism 46, as viewed, includes a valve housing 48 with a flow passage 50 therein which communicates on the inlet side with an outlet line 52 from the auxiliary pump 24, and on the outlet side with a torque converter charging pressure control line 54. The valve housing 48 has situated therein and in the flow passage 50, a check valve, designated at 56, comprising a ball 58 and a spring 60 which biases the ball 58 to a closed position against a conical seat 62 in the flow passage 50. Adjacent the ball check valve 56 and slidable within a bore in the valve housing 48 is a pressure regulating valve 64 which is formed with spaced lands 66, 68 and 70, all of the same diameter. When fluid pressure supplied via a side passage 72, communicating with flow passage 50, to the top of the regulating valve 64 is slight, a spring 74 will urge the valve 64 upwardly so that the land 68 will interrupt flow between ports connected, respectively, to a bypass 76 and a relief passage 78 and the land 70 will stop flow between passage 50 and an exhaust port 80 which extends to the sump.

To describe the operation of the control mechanism 26 assume, first, that the output from the main pump 22 is not sufficient to satisfy the pressure requirements of the torque converter 10 and that both the main and auxiliary pumps 22 and 24 are being revolved with the torque converter impeller 12. With this condition the fluid pressure in the charging pressure control line 54 will be below the 40 p.s.i. minimum, whereupon the control mechanism regulator valve 64 will be forced upwardly by the spring 74, and close or partially restrict the exhaust port 80. The auxiliary pump 24 being a positive displacement pump then will develop a fluid pressure adequate to unseat the check valve 56 and start to supplement, via control line 54, the pressure supplied by the main pump 22 to the converter inlet 19. When the pressure in the control line 54 and, accordingly, that in the inlet 19 to the converter 10, builds up to the 40 p.s.i., the control mechanism regulating valve 64 will regulate employing the exhaust port 80 for relief and the ball check valve 56 will continue to open and close as needed to maintain this 40 p.s.i. pressure.

When the 40 p.s.i. pressure in the control line 54 is exceeded, the check valve 56 will close and the regulating valve 64 will be moved downwardly far enough for land 70 to commence opening exhaust port 80. As the control line pressure increases, the exhaust port 80 will continue to open until fully opened. Hence, above 40 p.s.i. pressure the auxiliary pump 24 is unloaded reducing the power required to drive the pump 24 to a minimum. Thus, the auxiliary pump 24 never supplements the pressure supplied by the main pump 22 to the transmission control system supply line 34 and, accordingly, the main pressure regulated value for line 34 provided by distributor valve 26 will in actual practice be at least greater than the minimum converter charging pressure established by control mechanism 46 omitting pressure drops in lines 36 and 54.

Now, if the condition exists where the output pressure from the main pump 22 is such that the pressure furnished through the torque converter supply line 36 extending from the distributor valve 26 tends to become greater than the desired 60 p.s.i. maximum, the control mechanism regulating valve 64 will be shifted downwardly further by the resultant pressure in control line 54 until the land 68 opens the port connected to the relief passage 78. Pressure fluid in the bypass 76 will then be relieved out passage 78 and the regulator valve 64 will operate reciprocating to open and close the port connected to the relief passage 78 as needed to maintain the 60 p.s.i. pressure in the control line 54 and thus the charging pressure within the converter 10. The exhaust port 80 will continue, as explained, to divert the auxiliary pump output back to the sump.

Another function of the auxiliary pump 24 is to circulate fluid through a filter 82 first and then a cooler 84. Both the filter 82 and the cooler 84 are of suitable construction and are positioned in the auxiliary pump outlet line 52. With this arrangement, since the exhaust port 80 for the control mechanism regulator valve 64 is normally being utilized to return all or a portion of the fluid from the auxiliary pump back to the sump, a constant circulation is taking place which filters and cools the fluid in the sump. In fact, the fluid contributed by the main pump 22 for maintaining the converter charge pressure within the desired limits passes through the converter 10, the various lubrication channels, and then returns to sump; hence, is likewise filtered and cooled. This feature is advantageous in vehicle transmissions, particularly after vigorous driving, because, when the engine is subsequently idled, the fluid in the sump is still filtered and cooled.

Another significant aspect of the control mechanism 46 is that the ball check valve 56 offers a safe-guard against the possibility of failures, such as leaks, from being communicated to the main pump system. In other words, should a leak occur, for instance, in line 52, the ball check valve 56 will close so that fluid pressure in the control line cannot escape through the leak and disrupt operation of the main pump system.

The invention is to be limited only by the following claims.

We claim:

1. In a control system for a pair of supply lines, the combination of a main source of fluid pressure connected to one of the supply lines, means for connecting the main source to the other supply line whenever the fluid pressure requirements of said one supply line are satisfied, an auxiliary source of fluid pressure, means sensitive to the fluid pressure within said other supply line and arranged both to establish communication between the auxiliary source and only said other supply line when the fluid pressure therein is below a predetermined minimum pressure value so as to only supplement the fluid pressure from the main source to said other supply line and produce the predetermined minimum pressure value and to interrupt communication between the auxiliary source and said other supply line and exhaust the output of said auxiliary source when the predetermined minimum pressure value is exceeded and also to limit the fluid pressure within said other supply line to a predetermined maximum pressure value higher than the predetermined minimum pressure value.

2. In a control system for a hydrodynamic torque transmitting device, the combination of a main source of fluid pressure for supplying a transmission control system and the device, an auxiliary source of fluid pressure, means continuously sensitive to only the fluid pressure within the device and arranged both to establish communication between the auxiliary source and the device whenever the fluid pressure therein is below a predetermined minimum so as to supplement the fluid pressure from the main source to the device and produce the predetermined minimum pressure and to interrupt communication between the auxiliary source and the device whenever the predetermined minimum pressure is exceeded and to limit the fluid pressure within the device to a predetermined higher maximum pressure, the output of said auxiliary source of fluid pressure being exhausted when said communication is interrupted.

3. In a control system for a hydrodryamic torque transmitting device having an inlet and an outlet, the combination of a fluid sump in communication with the device outlet, main and auxiliary pumps communicating with the sump, the main pump supplying fluid pressure to a transmission control system and the device inlet, and control means connected to the main and auxiliary pumps and said device and being continuously sensitive to only the pressure within the device, the control means being arranged when the fluid pressure within the device is below a predetermined minimum pressure value to establish communication between the auxiliary pump and the device inlet so as to supplement the fluid pressure from the main pump to the device and produce a predetermined minimum pressure value within the device and when the predetermined minimum pressure value is exceeded being arranged to interrupt communication between the auxiliary pump and the device inlet and connect the auxiliary pump to return fluid to the sump and also acting to limit the fluid pressure within the device to a predetermined maximum pressure value higher than said predetermined minimum pressure value, and a fluid cooler arranged between the auxiliary pump and the control means for cooling fluid pumped thereby.

4. In a control system for a hydrodynamic torque transmitting device; the combination of a main pump for supplying fluid pressure to a transmission control system and the device; an auxiliary pump; and a control mechanism for maintaining the fluid pressure within the device within a pressure range defined by predetermined minimum and maximum pressures; the control mechanism comprising a pressure regulator valve continuously sensitive to only the fluid pressure in the device and arranged to regulate only the fluid pressure therein, and a check valve between the auxiliary pump and the device; the pressure regulator valve being operative at all times when the fluid pressure within the device is below the predetermined minimum to cause the check valve to open and establish communication between the auxiliary pump and the device so as to supplement the fluid pressure from the main pump and produce the predetermined minimum pressure, and operative at all times when the predetermined minimum pressure is developed to prevent the fluid pressure within the device from exceeding the predetermined maximum pressure while causing the check valve to close and interrupt communication between the auxiliary pump and the device and also provide a fluid block between the transmission control system and the upstream side of the check valve, the output of said auxiliary pump being exhausted when said communication is interrupted.

5. In a control system for a device having outlet means for restricting flow, the combination of a main source of fluid pressure for primarily supplying another control system and for secondarily supplying said device, an auxiliary source of fluid pressure for supplying only said device, pressure regulating and controlling means connected to said sources and said device for controlling the pressure in said device independently of the pressure in said other control system and between a predetermined low pressure value and a predetermined high pressure value having means operative whenever the pressure available from said main source to said device is below said predetermined low pressure for connecting both of said sources to said device to increase the pressure in said device to said low pressure value, operative whenever the pressure is above said low pressure value for exhausting only said auxiliary source to normally provide a pressure in said device between said low pressure value and said high pressure and operative at said high pressure value for also exhausting said main source to limit the pressure in said device to said high pressure value under all conditions.

6. The invention defined in claim 5 and said pressure regulating and controlling means being operative above said low pressure value for disconnecting said auxiliary source from said device.

7. In a control system for a first device having outlet means for restricting flow, the combination of a main source of fluid pressure for connection to a second device and said first device, an auxiliary source of fluid pressure, pressure regulating and controlling means connected to said sources and said devices for controlling the pressure in said first device independently of the pressure in said second device and between a predetermined low pressure value and a predetermined high pressure value having means operative at all times when the pressure is below said predetermined low pressure for connecting both of said sources to said first device to increase the pressure in said first device to said low pressure value independently of the pressure in said second device, means operative at all times when the pressure is above said low pressure value for exhausting only said auxiliary source to normally provide a pressure in said first device between said low pressure value and said high pressure value and means operative at said high pressure value for also exhausting said main source to limit the pressure in said first device to said high pressure value under all conditions.

8. In a control system for a device having outlet means for restricting flow, the combination of main fluid supply means including a main source of fluid pressure and main pressure regulating means for satisfying the fluid pressure requirements of another control system and making any excess fluid pressure available for said device, an auxiliary source of fluid pressure, pressure regulating and controlling means separate from said main pressure regulating means connected to said sources and said device for controlling the pressure in said device independently of the pressure in said other control system and between a predetermined low pressure value and a predetermined high pressure value having movable valve means responsive to only the pressure in said device operative whenever the pressure is below said predetermined low pressure in a first position for connecting both of said sources to said device to provide said low pressure in said device, said auxiliary source being connected in said first position to supply only said device, operative whenever the pressure is above said low pressure value in a second position for disconnecting said auxiliary source from said device and exhausting only said auxiliary source to normally limit pressure rise above said low pressure and operative at said high pressure value for also exhausting said main source to limit the pressure in said device to said high pressure value under any conditions.

References Cited by the Examiner

UNITED STATES PATENTS

| | | | |
|---|---|---|---|
| 2,441,356 | 5/1948 | Hertrich | 60—54 |
| 2,626,669 | 1/1953 | Moore et al. | 170—160.21 |
| 2,736,412 | 2/1956 | Livezey | 192—85 |
| 2,750,018 | 6/1956 | Dundore | 192—3.2 |
| 2,818,708 | 1/1958 | Kelley | 60—54 |
| 2,875,643 | 3/1959 | Kelley | 74—645 |
| 2,935,898 | 5/1960 | Ahlen | 60—54 X |
| 3,010,278 | 11/1961 | Winchell et al. | 60—54 X |

JULIUS E. WEST, *Primary Examiner.*